US006623413B1

United States Patent
Wynne

(10) Patent No.: US 6,623,413 B1
(45) Date of Patent: *Sep. 23, 2003

(54) VACUUM INSULATED PANEL AND CONTAINER AND METHOD OF PRODUCTION

(75) Inventor: Nicholas Wynne, Hilliard, OH (US)

(73) Assignee: Energy Storage Technologies, Inc., Dayton, OH (US)

( * ) Notice: Subject to any disclaimer, the term of this patent is extended or adjusted under 35 U.S.C. 154(b) by 182 days.

This patent is subject to a terminal disclaimer.

(21) Appl. No.: 09/642,877

(22) Filed: Aug. 21, 2000

Related U.S. Application Data

(63) Continuation of application No. 09/304,191, filed on May 3, 1999, now Pat. No. 6,106,449, which is a continuation-in-part of application No. 08/997,126, filed on Dec. 23, 1997, now Pat. No. 5,900,299.
(60) Provisional application No. 60/033,827, filed on Dec. 23, 1996.

(51) Int. Cl.[7] .............................. B31B 7/00; B65B 31/00
(52) U.S. Cl. ........................ 493/101; 53/432; 53/434; 53/472; 53/510; 53/512
(58) Field of Search .............................. 493/101; 53/432, 53/434, 472, 510, 512

(56) References Cited

U.S. PATENT DOCUMENTS 2,949,715 A    8/1960   Tarleton et al.
3,416,692 A    12/1968  Cline et al.
3,450,253 A    6/1969   Nielsen
4,662,521 A *  5/1987   Moretti ........................ 206/484
4,668,551 A *  5/1987   Kawasaki et al. ........... 156/286
4,745,730 A *  5/1988   Bartle, Sr. .................... 141/65
4,949,529 A *  8/1990   Davis ........................... 206/525
4,988,406 A *  1/1991   Nelson ......................... 156/146
5,082,335 A    1/1992   Cur et al.
5,252,408 A    10/1993  Bridges et al.
5,273,801 A    12/1993  Barry et al.
5,843,353 A    12/1998  De Vos et al.
5,900,299 A    5/1999   Wynne

* cited by examiner

Primary Examiner—Rinaldi I. Rada
Assistant Examiner—Brian Nash
(74) Attorney, Agent, or Firm—Jacox, Meckstroth & Jenkins

(57) ABSTRACT

A core panel or box of rigid plastics microporous foam is provided with parallel spaced passages or thin grooves and is placed within an envelope or bag of flexible multi-layer barrier film impervious to the passage of gas. The bag includes an integral evacuation tubular portion which is releasably coupled to an evacuation nozzle connected by a manifold with solenoid valves to a vacuum pump. After air is substantially evacuated from the foam core and the bag to collapse the bag against the foam core and into the grooves, a vacuum sensor operates a computer which controls the valves for checking the vacuum level within the bag and for optionally admitting an additive gas. Closely spaced grooves within opposite sides of the foam panel provide for bending the evacuated panel, and a thin layer of foam is applied to the outer surface of the vacuum insulated panel to provide a protective outer surface.

14 Claims, 6 Drawing Sheets

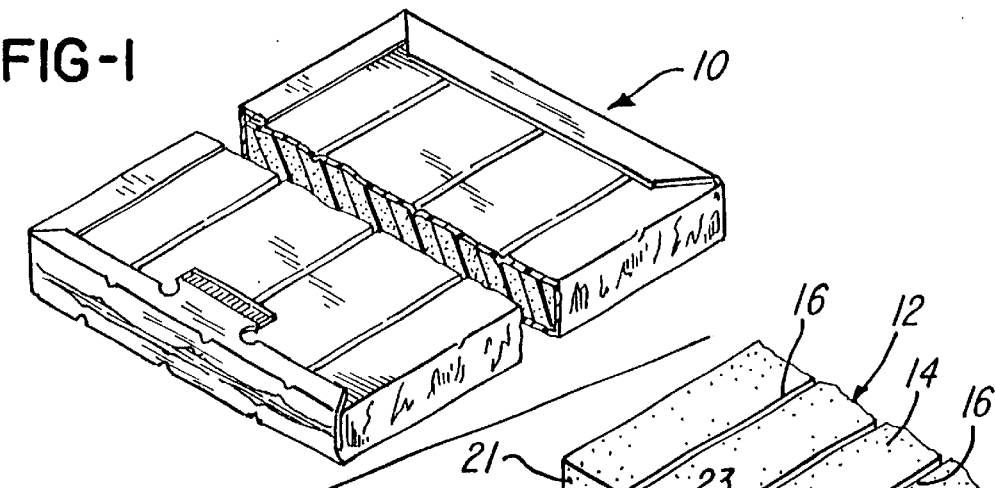
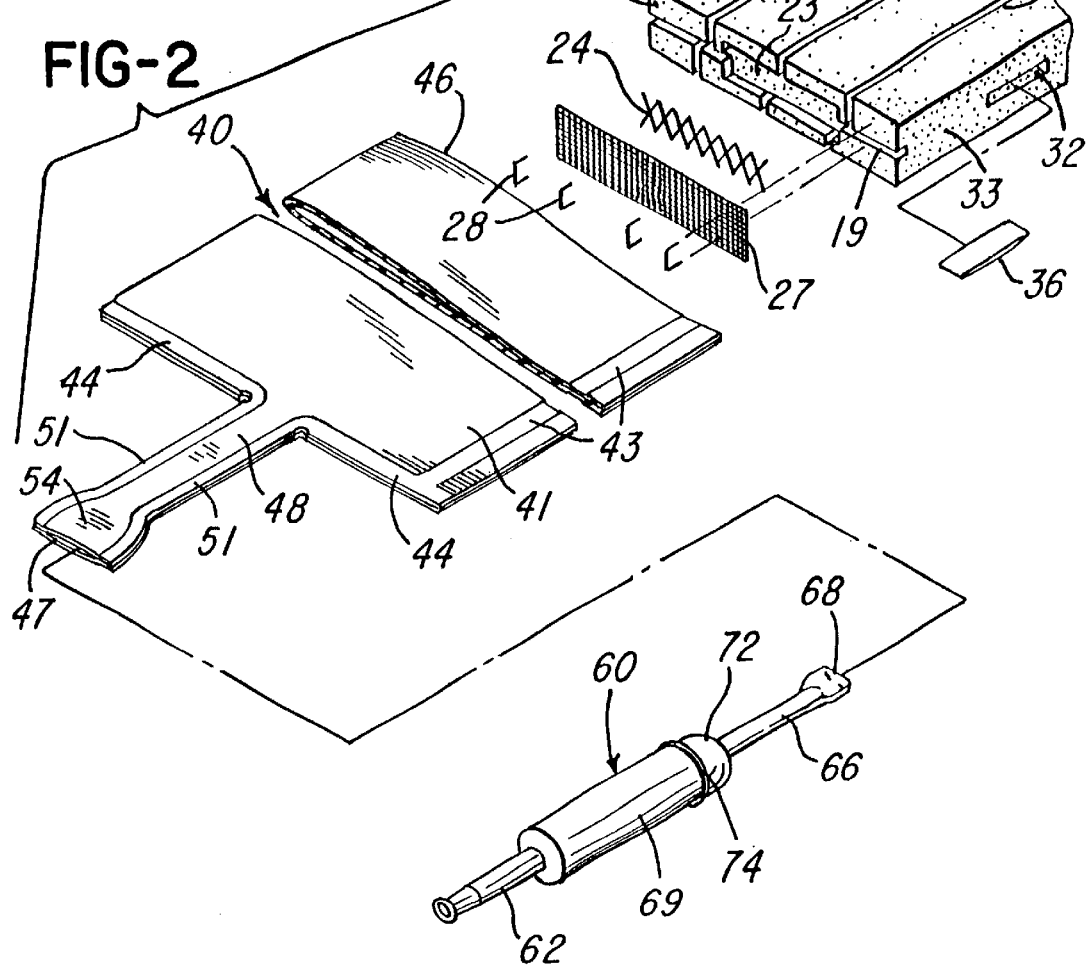

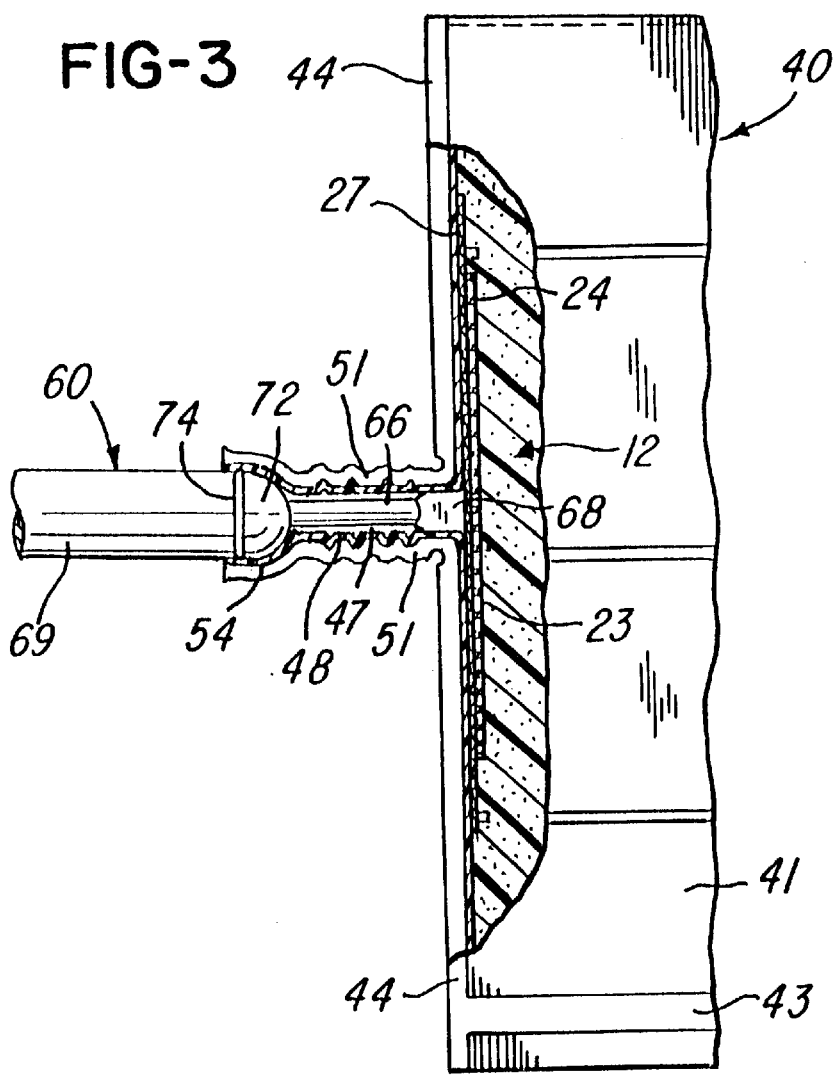
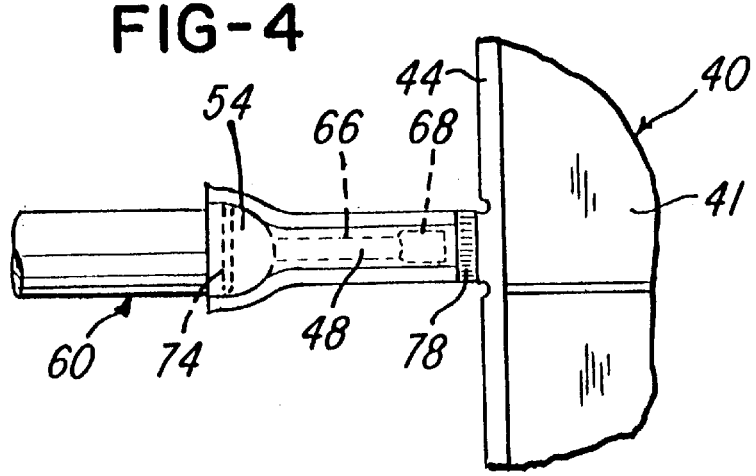

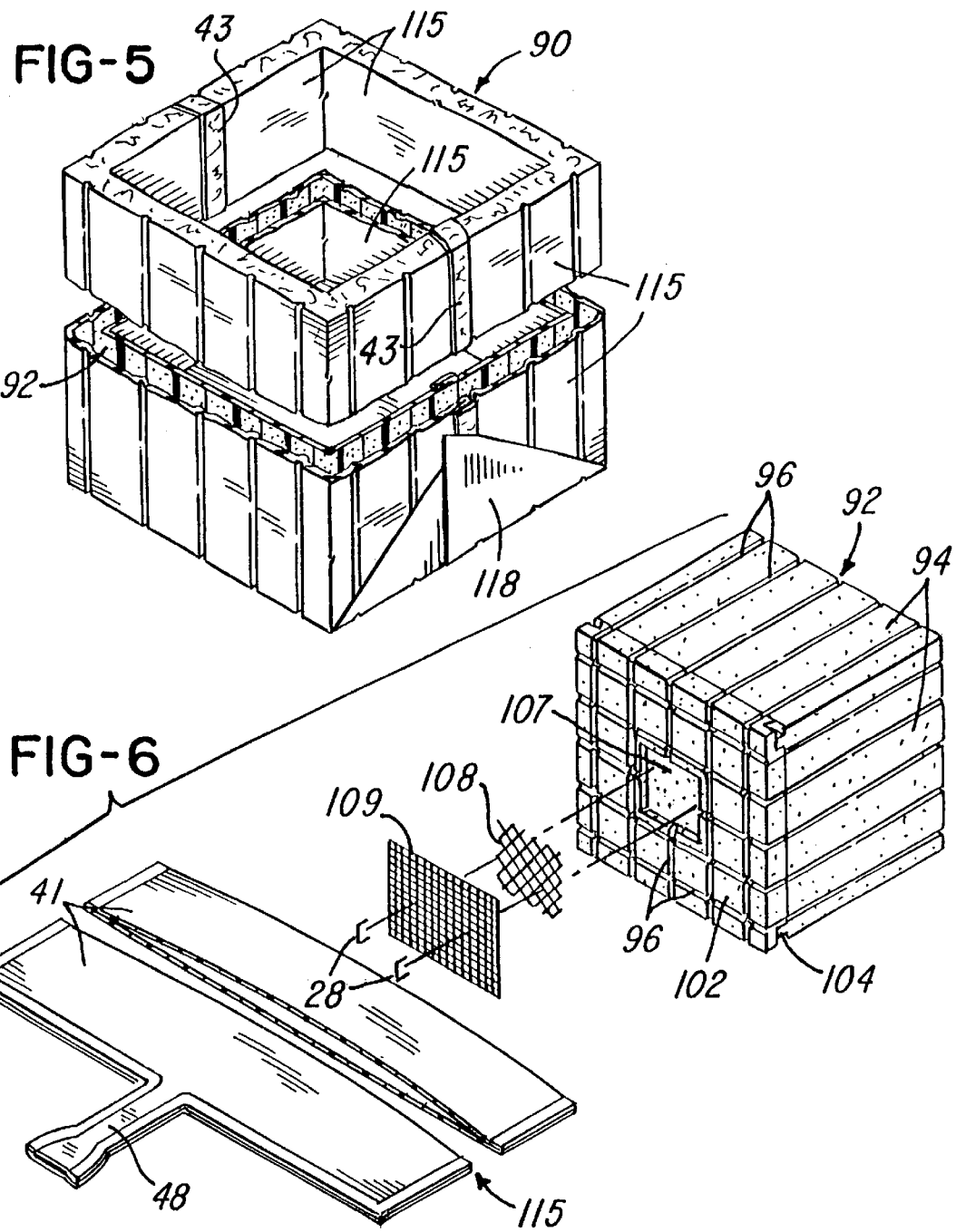

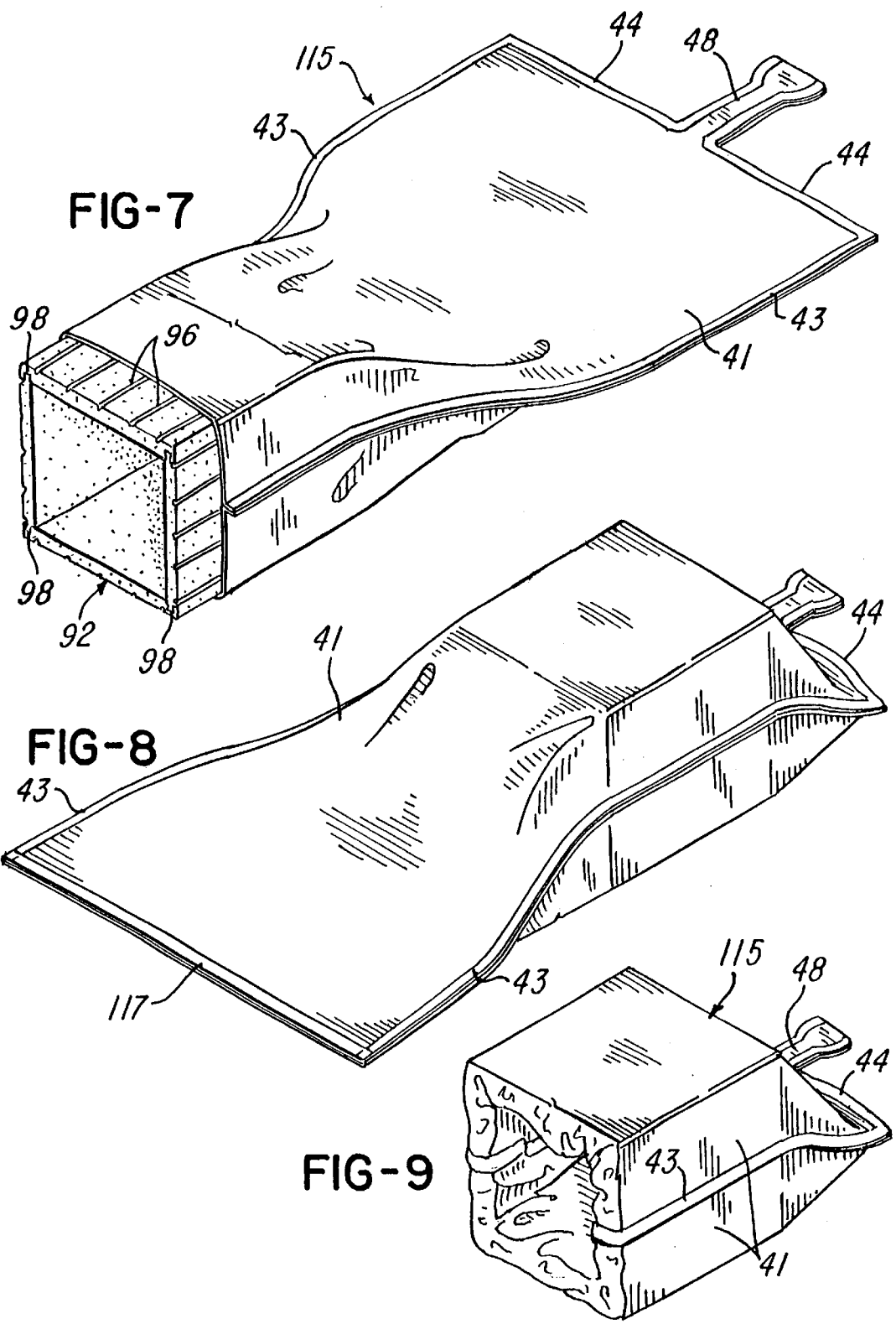

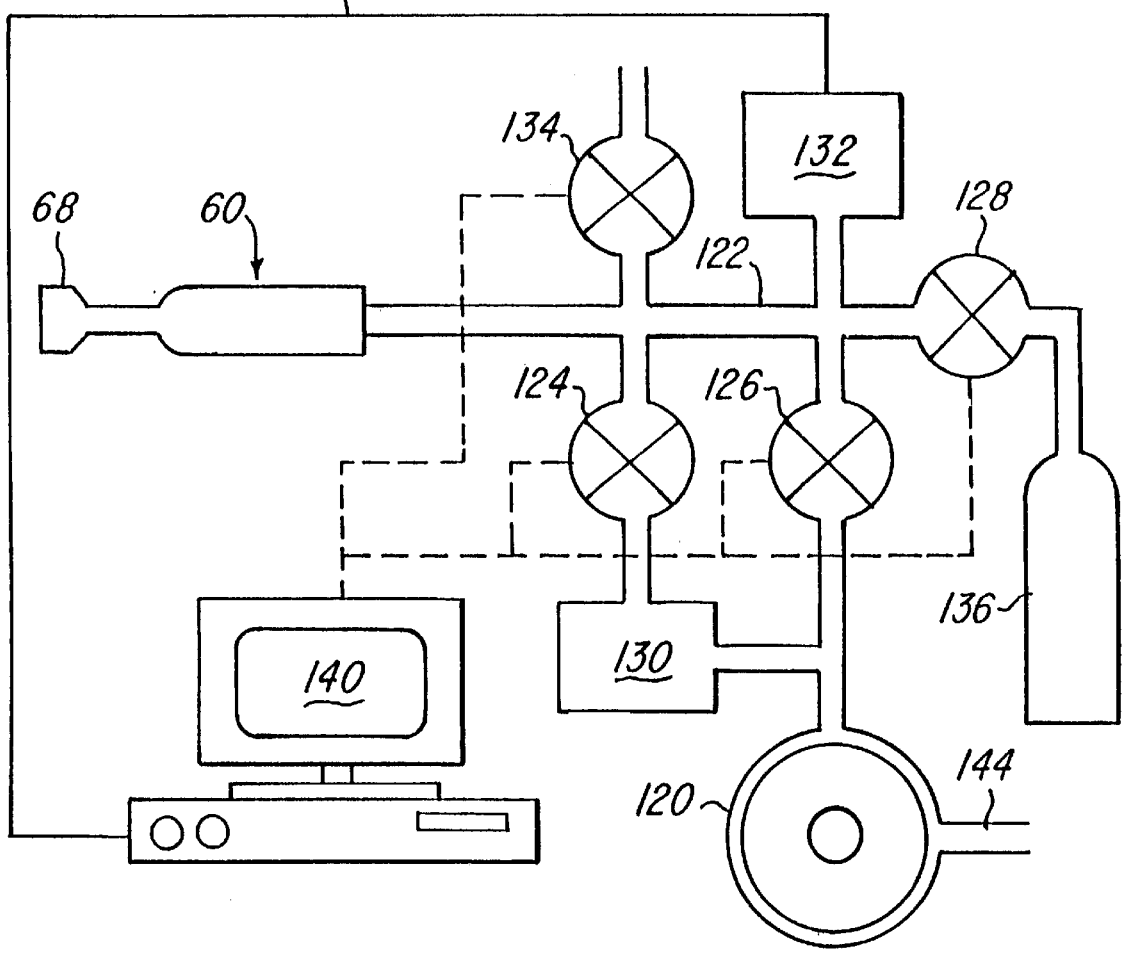
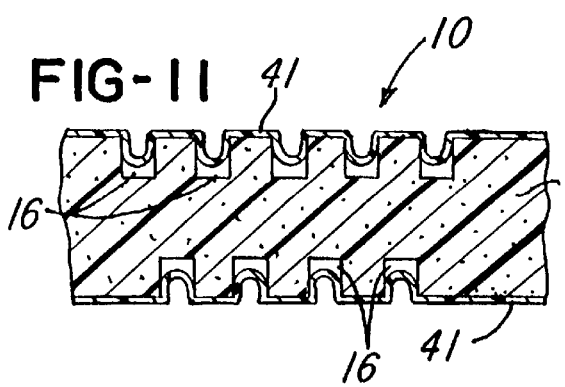
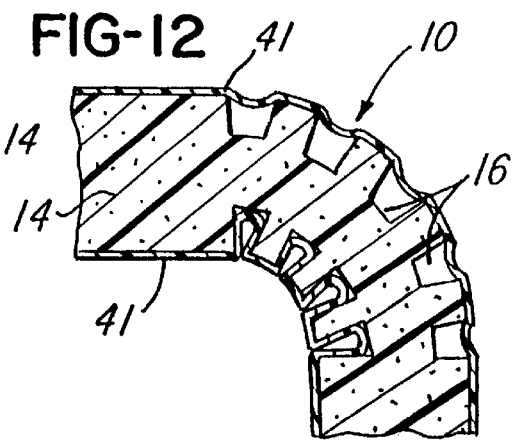

VACUUM INSULATED PANEL AND CONTAINER AND METHOD OF PRODUCTION

RELATED APPLICATION

This application is a continuation of application Ser. No. 09/304,191, filed May 3, 1999, now U.S. Pat. No. 6,106,449, which is a continuation-in-part of application Ser. No. 08/997,126, filed Dec. 23, 1997 now U.S. Pat. No. 5,900,299 and also claims the benefit of provisional patent application Ser. No. 60/033,827, filed Dec. 23, 1996.

BACKGROUND OF THE INVENTION

In the production of insulated panels or containers, for example, of the general type disclosed in U.S. Pat. Nos. 3,416,692, 5,082,335, 5,252,408 and 5,273,801, it is known to place a panel of microporous insulation material, such as a rigid foam having extremely small open cells, within an envelope or bag of an air impervious flexible barrier film. A plurality of the open bags are then usually placed within a vacuum chamber which evacuates air from the foam, after which each bag is sealed while in the vacuum chamber. It is also known to evacuate a sealed insulation bag by attaching an evacuation tube to a sealed bag, for example, as disclosed in above-mentioned U.S. Pat. No. 5,252,408.

In the production of vacuum insulation panels such as disclosed in the above-mentioned patents, it is desirable to provide for rapid evacuation of the air from the microporous insulation media, especially from foam material within large panels, and to assure that substantially all of the air is evacuated from the media. It is also desirable to determine that an evacuated panel does not have any leakage before the panel is sealed and to provide for efficiently producing a vacuum insulated box-like container which has minimal panel joints in order to minimize thermal leak paths and provide the container with a maximum R value.

SUMMARY OF THE INVENTION

The present invention is directed to an improved vacuum insulated panel and container which have the maximum R value per inch of wall thickness and to an efficient and dependable method of producing such panels and containers. In accordance with preferred embodiments of the invention, a generally flat panel or box-like container is produced by forming parallel spaced grooves within a flat panel of rigid microporous plastics foam having open cells on the order of 150 microns or less. The foam panel is inserted into a partially sealed envelope or bag of gas impervious barrier plastics film material or the foam panels are formed into an open end box which is inserted into a bag of the barrier film material. The bag includes an integrally formed tubular evacuation portion and is sealed around the panel or box of the foam material.

The bag is then evacuated with a computer control evacuation system including a nozzle which is releasably sealed to the tubular evacuation portion of the bag. The grooves provide for rapid evacuation of the foam and for receiving the barrier film material during evacuation. The evacuation system senses the vacuum level within the bag during evacuation and automatically controls a set of valves which may provide for directing an additive gas into the foam after a very low level of the evacuation is attained. The evacuation system also checks or monitors the vacuum to assure a constant vacuum level within the bag before the bag is sealed, and thereby assure the production of high quality vacuum insulation panels or containers. A thin layer of rigid foam is applied in liquid form to the outer surfaces of the vacuum insulated panel and allowed to cure to provide the panel with thermal and mechanical protection as well as a panel with a uniform thickness and a smooth outer surface.

Other features and advantages of the invention will be apparent from the following description, the accompanying drawings and the appended claims.

BRIEF DESCRIPTION OF THE DRAWINGS

FIG. 1 is a perspective view of a vacuum insulated panel produced in accordance with the invention and with the center portion broken away;

FIG. 2 is an exploded perspective view showing the components of the panel in FIG. 1 and the nozzle used for evacuation;

FIG. 3 is a fragmentary plan view of the panel shown in FIG. 1 with a portion shown in section during the evacuation process;

FIG. 4 is a fragmentary plan view of the panel shown in FIG. 3 after the evacuation and sealing operations;

FIG. 5 is a perspective view of a vacuum insulated container constructed in accordance with another embodiment of the invention and with the center portion broken away;

FIG. 6 is an exploded perspective view of the components used to form the container of FIG. 5;

FIGS. 7–9 are perspective views illustrating the method of producing the vacuum insulated container shown in FIG. 5;

FIG. 10 is a schematic diagram of the system for evacuating the panel shown in FIG. 1 and the container shown in FIG. 5;

FIG. 11 is a fragmentary section through a vacuum insulated panel constructed in accordance with a modification of the invention;

FIG. 12 is a fragmentary section showing the panel of FIG. 11 after bending.

DESCRIPTION OF THE PREFERRED EMBODIMENTS

Figure 13:
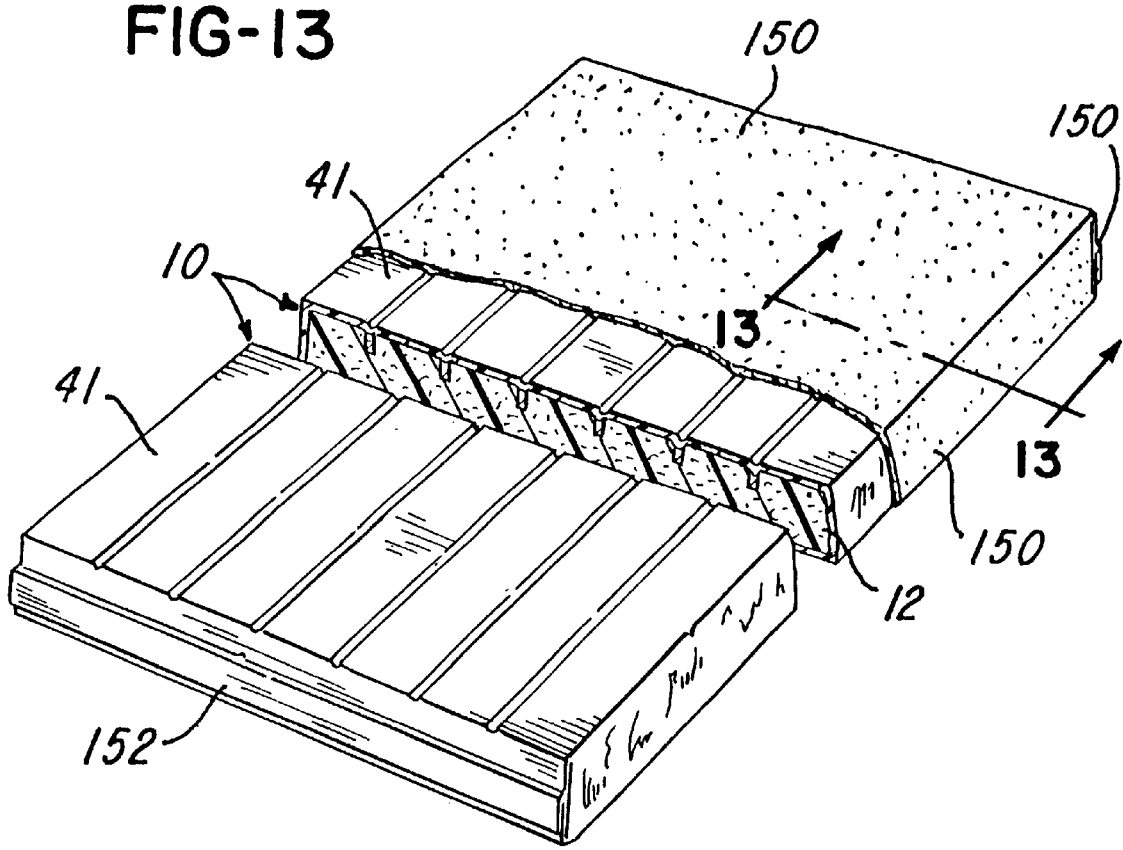
FIG. 13 is a fragmentary perspective view of a vacuum insulated panel having a thin outer protective layer of rigid foam, and constructed in accordance with a modification of the invention.

A vacuum insulated panel 10 includes a core 12 of filler material in the form of a rigid foam having open cells which are extremely small, for example, on the order of four microns. One source for the microporous foam core 12 is Dow Chemical Company of Midland, Mich. As shown in FIG. 2, the rigid foam core 12 comprises a board or strip or panel having opposite side surfaces 14 in which are cut or formed parallel spaced evacuation passages or grooves 16. The grooves extend the full length of the core 12 and intersect a common groove 19 formed within an end or edge surface 21 of the core 12. Laterally extending grooves may also be used to intersect the grooves 16.

The end groove 19 extends from a recess or cavity 23 which receives a spacer in the form of one or more strips 24 of plastic wire-like mesh which is retained within the cavity 23 by a plastic screen mesh 27 and a series of staples 28 extending into the foam core 12. Preferably, each of the grooves 16 and 19 has a width of about 0.125 inch and a depth of about 0.200 inch. The foam core 12 is also provided with a slot 32 within an edge surface 33, and a packet 36 of desiccant or getter material, such as calcium oxide, is inserted into the slot 32 to absorb any residual gas and/or moisture from the foam core.

The vacuum insulated panel 10 also includes a container or enclosure 40 for the rigid foam core 12, and the enclosure is preferably in the form of a pouch or bag of flexible barrier film material 41 which is impervious to the passage of air and other gases. One form of flexible barrier film material 41, which has performed satisfactorily, includes a plurality of polyester or MYLAR layers including an inner layer of heat-sealable polyethylene and an outer metalized or aluminum layer which is formed by laminating a metal foil to the film layer or by metal deposition on the layer. Sources of such flexible barrier film material are Fresco in Pennsylvania and DuPont in Delaware.

As shown in FIG. 2, the enclosure or bag 40 may be initially formed by double folding the barrier film material 41 or by using two sheets of the film material and then fusing or sealing together the inner opposing thermoplastic layers of the film material by a series of peripheral heat-seals 43 and 44 along two sides or one end of the bag. When the bag is initially formed, one end 46 of the bag is left open, and the opposite end is provided with an evacuation channel or passage 47 formed by a projecting tubular portion 48 of the bag. The integral tubular portion 48 has marginal heat-seals 51 which extend from the heat-seals 44 and includes a flared outer end portion 54 which forms an enlarged circular mouth for the evacuation passage 47.

In the production of the vacuum insulated panel 10, the rigid open cell foam core 12 with the attached spacer screens 24 and 27 and confined desiccant or getter package 36, is inserted into the opening 46 of the enclosure or bag 40. The open end portion of the bag 40 is then heat-sealed so that the bag 40 forms a positive air-tight enclosure completely surrounding the rigid foam core 12.

When it is desired to evacuate or remove all of the air from inside the bag 40, an evacuation tool 60 (FIG. 2) is used to remove the air within the bag 40 and from the microscopic open pores or cells within the rigid foam core 12. The metal tool 60 has a tubular outer end portion 62 which is preferably connected by a flexible hose to an evacuation pump through a set of valves, as will be explained later. The opposite end of the tool 40 includes a metal evacuation tube 66 with a flared or flattened tip portion 68 which defines a suction slot. The tool 60 also includes a cylindrical portion, 69 having a tapered or rounded nose surface 72 with a circumferential groove receiving a resilient O-ring 74.

To evacuate the bag or enclosure 40, the evacuation tube 66 is inserted into the tubular portion 48 of the bag 40 until the inner end of the flared tip portion 68 engages the spacer screen 27, as shown in FIG. 3. After the tool 60 is inserted, the flared portion 54 of the evacuating tube 48 is pulled onto the rounded or tapered end surface 72 of the tool 60, as shown in FIG. 3, until the O-ring 74 forms an air-tight seal with the film material. A vacuum gel may be coated over the O-ring 74 and within the flared portion 54 to assure an air-tight seal between the tool 60 and the evacuation tube 48. As the flattened tip portion 68 engages the spacer screen 27, the tubular portion 48 is caused to bunch and form a bellows-like neck portion. It is also within the scope of the invention to use a nozzle which supports a stack of resilient O-rings for receiving the tubular portion 48, and a clamping collar is shifted by an actuator axially over the tubular portion 48 and around the O-rings to compress the tubular portion against the O-rings.

The evacuation pump is operated until a vacuum of under 0.1 Torr and preferably about 0.05 Torr is obtained within the bag and the cells of the rigid foam core 12. After the bag 40 is evacuated, the bag is tested for leaks, and while a vacuum is still being applied, the tool 60 is retracted to the position shown in FIG. 4. The evacuation tube 48 then receives a heat-seal 78 so that the evacuated bag 40 is completely sealed to prevent air from re-entering the evacuated open cells of the foam core 12. The evacuation tube 48 is then removed by cutting the tube adjacent the heat-seal 78, after which the heat-sealed peripheral edge portions of the enclosure 40 are folded back and attached by adhesive or tape to the adjacent side surfaces of the panel 10, as shown in FIG. 1. The folded back peripheral edge portions may also be retained by extruded plastic U-shaped channels.

Referring to FIGS. 5–9 which illustrate another embodiment of the invention, a vacuum insulated box-like container 90 is constructed similar to the panel 10 and includes a box-shaped core 92 (FIG. 6) of the open cell microporous rigid foam material. The foam core 92 is formed from flat foam side panels 94 each of which has parallel spaced grooves 96 on its outer surface. The panels are joined together at the corners by dove-tail connections 98 (FIG. 7) or tongue and groove connections, and one end of the core 92 is closed by a bottom panel 102 having a grid of X-Y grooves 96 which intersect the grooves 96 within the sidewall panels 94. The bottom panel 102 is connected to the sidewall panels by tongue and groove connections 104, and a rectangular cavity 107 is formed within the bottom surface of the bottom panel 102. The cavity 107 receives one or more strips of plastic mesh 108 which are retained by a plastic screen mesh 109 and a set of staples 28, as described above in connection with FIGS. 2 and 3.

As shown in FIG. 7, the foam box 92 is inserted into the open end of a plastic film envelope or bag 115 which is constructed similar to the envelope or bag 40 described above and of the same flexible barrier film material 41. The bag 115 also includes an integral tubular portion 48 which is used as described above for evacuating the bag. After the foam core box 92 is inserted into the bag 115 (FIG. 7), the bag 115 is closed on its open end by a heat seal 117 (FIG. 8). The foam core box 92 and bag 115 are then evacuated through the integral evacuation tube 48, using the method described above and in more detail in connection with FIG. 10.

Referring to FIG. 9, as the bag 115 is being evacuated, the end portion of the bag projecting from the box 92 (FIG. 8) is sucked or pulled down into the open end of the box 92, and the external flap portions 118 (FIG. 5) of the collapsed bag are folded against the outer surfaces of the evacuated container 90. If desired, the parallel spaced grooves 96 may also be formed within the inner surfaces of the side panels 94 and bottom panel 102 to provide for more rapid evacuation and to provide for accumulating the barrier film material as it shrinks against the foam core. It is also within the scope of the invention to form or produce two vacuum insulated containers 90 with one container being slightly larger than the other container so that the smaller container interfits into the larger container in opposing relation to form a completely enclosed vacuum insulated container. The open end of the insulated container 90 may also be closed by a vacuum insulated panel 10 which interfits snugly into the open end of the container 90.

Referring to FIG. 10 which illustrates diagrammatically a system for evacuating a bag 40 or 115 and the foam core within the bag, the tubular portion 48 of the bag is inserted onto the nozzle 60 which is connected to a vacuum pump 120 through a manifold passage 122 connected to a set of valves 124, 126 and 128 and through a filter 130. A vacuum sensor or transducer 132 senses the level of the vacuum within the manifold passage 122 and thus within the bag and nozzle 60, and a passage including a valve 134 is connected to exhaust the manifold passage 122. A bottle or tank 136 of compressed gas, such as helium, is connected to the manifold passage 122 through the valve 128, and all of the valves 124, 126, 128 and 134 are solenoid actuated valves which are selectively controlled by a controller or computer 140. A data line 142 connects the vacuum sensor or transducer 132 to the computer 140 so that the solenoid valves may be controlled or actuated in response to the level of vacuum created in the nozzle 60 and the bag by the vacuum pump 120.

In operation of the evacuation system shown in FIG. 10, the bag is connected to the nozzle 60 while the exhaust valve 134 is open and the valves 124, 126 and 128 are closed. The computer 140, through its operating software, then commences the evacuation process whereby valve 134 is closed and valve 124 is opened to allow the bulk of the evacuation air in the bag and any loose foam particles to flow through the filter 130 to the vacuum pump 120 where air is discharged through an exhaust port 144. The filter 130 collects any loose foam particles, and the vacuum level is monitored by the transducer 132 which feeds back the vacuum level information to the computer 140.

After air pressure has been reduced in the bag to the level of several Torr, the air flow is slower so that the flow does not carry significant foam dust particles. The computer 140 then closes the valve 124 and opens the valve 126 to increase the evacuation flow rate by bypassing the restriction of the filter 130. After a pressure level below one Torr is attained, the computer 140 may, as an option, close the valve 126 and open the valve 128 to admit additive pressurized gas, such as helium, from the tank 136. This gas is selected either to control the type of residual gas remaining within the bag at the completion of evacuation to provide improved insulation qualities, or to help purge residual gases from the foam core. The valve 128 is then closed by the computer 140, and valve 126 is reopened to complete evacuation.

The computer 140 is programmed by its software to close periodically all of the valves and allow the resulting vacuum level in the bag and manifold 122 to be sensed by the transducer 132 so that the computer 140 may determine whether a satisfactory final vacuum level has been achieved and that there are no leaks in the bag before the bag is sealed. If the vacuum level has not been achieved, the valve 126 is reopened by the computer for a predetermined time after which the test cycle is repeated. After a satisfactory test result, the valve 126 is opened by the computer, and the operator seals the tubular portion 48. The keyboard of the computer 140 is then used to enter a signal that the tube 48 on the bag has been sealed. The computer then closes valve 126 and opens valve 134 to flood the manifold 122 and nozzle 60 to atmospheric air pressure. This permits the bag evacuation tube 48 to be easily removed from the nozzle 60 so that the bag for the next panel or container may be connected to the evacuation system.

Referring to FIGS. 11 and 12, it is within the scope of the invention to form closely spaced grooves 16 within opposite sides of the foam panel 14 and to offset the grooves on one side from the grooves on the opposite side. When the foam and bag are evacuated, the film 41 collapses and is pulled into the groove 16, as shown in FIGS. 1 and 11. The panel 10 may then be curved or bent, as shown in FIG. 12, without tearing or rupturing the foam core panel 14 or the film 41 at the corner.

Figure 14:
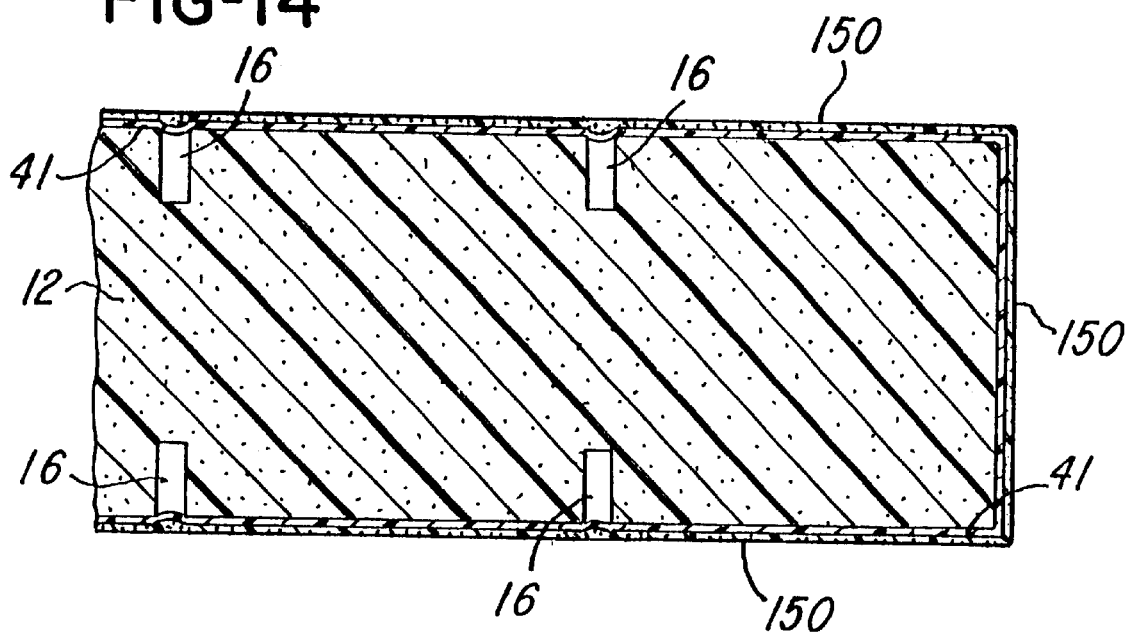
FIG. 14 is an enlarged fragmentary section of the panel, taken generally on the line 14—14 of FIG. 13.

Referring to FIGS. 13 and 14, a skin or layer 150 of polyurethane foam is applied to the outer surface or exterior of the vacuum insulated panel 10 after the panel is formed. Preferably, the layer has a thickness within the range of 0.060 inch and 0.250 inch. The foam within the layer 150 is preferably closed cell and has a density within a range of 1.0 pound per cubic foot to 4.0 pounds per cubic foot. For example, a density of 1.9 pounds per cubic foot has been found to provide desirable results. The layer 150 is applied in liquid form by a spray or as a laminated coating and may be applied to one or both flat side surfaces of the panel 10 or may surround the panel so that the layer also covers and bonds to folded sealed edge flanges 152 of the impermeable barrier film 41. As also shown in FIG. 14, the parallel spaced grooves 16 within the core 12 of open-microcell foam material preferably have a 10 depth substantially greater than the width of each groove, for example, a depth of $3/16$ inch and a width of $1/16$ inch. The narrow grooves are preferably cut into the foam core 12 with one inch spacing between adjacent grooves 16. The narrower or thinner grooves 16 result in larger vacuum passages for more rapid evacuation since the barrier film 14 is sucked into the grooves by a lesser extent during the evacuation step. The narrow grooves also minimize the suction force applied to the barrier film bridging the grooves.

As apparent from the drawings and the above description, a vacuum insulated panel constructed in accordance with the invention provides desirable features and advantages. For example, the connected grooves 16 and 19 or 96 within the foam core 12 or 92 are narrow and deep so that the grooves continue to form evacuation passages even after the flexible enclosure film has been partially sucked into the grooves. The grooves also provide for better flow of urethane foam around a panel 10 when the panel is used between walls. Evacuation passages may also be formed internally within a foam core panel by securing together two foam boards with one or both having grooves adjacent the other board. The evacuation passages substantially decrease the time for evacuating the microscopic open cells within the foam material. The grooves also decrease the time for the desiccant pouch 36 to absorb any free moisture in the panel, allow for panel flexing or bending and take up wrinkling slack in the film when the bag is evacuated, as shown in FIGS. 11 and 12.

In addition, the evacuation tool 60 provides for efficiently evacuating the enclosure 40 through the evacuation tube 48 which seals against a resilient O-ring during evacuation. The flattened tip portion 68 also cooperates with the spacer screens 26 and 27 or 108 and 109 to assure that the slot-like suction opening within the tip portion is not blocked by the foam core 12 or 92 and does not become clogged with foam particles during evacuation. The flared tip portion 68 also assures that the evacuation tube 48 remains flat without wrinkles when the tool 60 is retracted in order to obtain an effective heat-seal 78, as shown in FIG. 4.

The above method of efficiently forming a vacuum insulated panel 10 or container 90 uses relative low cost equipment and provides for flexiblity in that dependable panels or containers of various sizes and configurations may be produced with a substantially high R value per inch of thickness, for example, an R value over 30. Thus a vacuum insulated panel or container produced in accordance with the invention may be made in various shapes and sizes, such as a box, cylinder or three sided corner section, which are highly desirable for use in many applications such as in lining refrigeration or freezer cabinets and appliances, heating appliances, refrigerated containers and coolers and as insulation for a building.

The modification of the vacuum insulated panel shown in FIGS. 13 and 14 and including the exterior foam layer 150, provides additional advantages. For example, the foam layer 150 positively adheres or bonds to the outer surface of the panel 10 and provides both a mechanical and thermal protection for the barrier film 41 and an open cell foam core 12. That is, the foam layer 150 helps prevent the barrier film 41 from being punctured and also functions as a desiccant to the barrier film by restricting moisture from contacting the barrier film so that the barrier film's gas permeation rate remains low, thereby maximizing the life of the vacuum insulated panel 10. A desiccating additive, such as hydrophillic precipitated silica or calcium oxide, may be added to the polyurethane or other exterior foam insulation material forming the layer 150 to enhance the desiccating properties of the foam coating or layer.

It is also apparent from FIGS. 13 and 14 that the exterior foam skin layer 150 may also be used to provide the panel 10, with a smooth exterior finish or surface and also with a uniform thickness. This is frequently desirable when the foam panel 10 is used in the manufacture of applicances such as refrigerators. The insulating panel is sandwiched between the outer cabinet and the inner liner, and a polyurethane foam is used to fill the gaps between the vacuum insulated panel and the outer cabinet and/or inner liner. The foam layer 150 also provides a thermal delay when used with in situ foaming by preventing the peak transient temperatures generated during the exothermic chemical reaction of the foaming process from being transferred to the barrier film 41 and the core material 12. Also, while a semi-rigid or rigid polyurethane foam is described above for producing the protective layer 150, other foam materials, such as polyethylene or polypropylene foams, may be used to form the layer 150 for some applications or uses of the panel 10.

While the method and forms of vacuum insulation panel and container herein described constitute preferred embodiments of the invention, it is to be understood that the invention is not limited to the precise method and forms described, and that changes may be made therein without departing from the scope and spirit of the invention as defined in the appended claims.

What is claimed is:

1. A method of producing a vacuum insulated article, comprising the steps of forming a core box of microporous material and defining an open end chamber, forming a partially sealed bag of flexible gas impermeable film, positioning the core box within the bag, evacuating the bag and the core box, and sealing a remaining portion of the bag after the core box and bag are evacuated to a predetermined vacuum level causing the bag to enclose the core box tightly with the bag lining the chamber.

2. A method as defined in claim 1 and including the step of forming a plurality of evacuation grooves within an outer surface of the foam core box and with each groove having a depth substantially greater than its width.

3. A method as defined in claim 1 and including the step of positioning the partially sealed bag with a closed end portion overlying the open end chamber and with sufficient length to line the chamber.

4. A method as defined in claim 1 and including the step of forming the bag with a length generally twice the corresponding length of the core box.

5. A method of producing a vacuum insulated article, comprising the steps of forming a core of porous material and in the form of a core box defining an open end chamber, forming a partially sealed bag of flexible gas impermeable film and having a closed end portion, extending the film to form a tubular evacuation portion of the bag, positioning the core box within the bag, sealing the bag to form an air-tight enclosure around the core box, evacuating the bag and the core box with a tubular nozzle projecting into the tubular evacuation portion of the bag and connected to a vacuum pump and for sucking the closed end portion of the bag into the open end chamber, and sealing the tubular evacuation portion of the bag after the core box and bag are evacuated to a predetermined vacuum level.

6. A method as defined in claim 5 wherein the bag is formed with a length generally twice the corresponding length of the core box.

7. A method as defined in claim 5 including the step of forming a plurality of parallel spaced grooves within outer surfaces of the core box to define evacuation passages.

8. A method as defined in claim 5 wherein the core box is formed by joining four generally flat foam core side panels and a generally flat foam core end panel connected to the side panels.

9. A method of producing a vacuum insulated article, comprising the steps of forming a core of porous material, forming a partially sealed bag of flexible gas impermeable film, extending a portion of the film and sealing the film portion to form an integral tubular evacuation portion of the bag, positioning the core within the bag, sealing the bag to form an air-tight enclosure around the core, evacuating the bag and the core with a tubular nozzle projecting into the tubular evacuation portion of the bag and connected to a vacuum pump, and sealing the tubular evacuation portion of the bag after the core and bag are evacuated to a predetermined vacuum level.

10. A method as defined in claim 9 and including the step of forming a plurality of evacuation grooves within an outer surface of the core of porous material, and with each groove having a depth substantially greater than its width.

11. A method as defined in claim 9 and including the step of sensing the vacuum level within the bag while evacuating the bag and before the tubular evacuation portion is sealed and while the vacuum pump is disconnected to the bag.

12. A method as defined in claim 9 and including the step of bonding a layer of foam material on the bag to form a protective outer surface for the article.

13. A method as defined in claim 9 and including the step of forming a cavity within an end surface of the core in opposing relation to the tubular evacuation portion of the bag, and retaining a porous spacer member within the cavity for preventing contact of the tubular nozzle with the foam core.

14. A method as defined in claim 9 and including the step of surrounding and contacting the tubular nozzle with a resilient O-ring for engaging the surrounding tubular evacuation portion of the bag to form a fluid-tight releasable coupling.

* * * * *